Oct. 6, 1970  P. J. MOORE  3,531,992

EXPENDABLE TYMPANIC MEMBRANE THERMOMETER

Filed July 12, 1968

United States Patent Office 3,531,992
Patented Oct. 6, 1970

3,531,992
EXPENDABLE TYMPANIC MEMBRANE THERMOMETER
Philemon J. Moore, Jenkintown, Pa., assignor to Leeds & Northrup Company, Philadelphia, Pa., a corporation of Pennsylvania
Filed July 12, 1968, Ser. No. 744,361
Int. Cl. G01k 7/02; H01v 1/02
U.S. Cl. 73—359          12 Claims

ABSTRACT OF THE DISCLOSURE

A thermometer for measuring the temperature of the tympanic membrane in an ear canal including a thermoelectric heat sensing device of small dimensions connected to a pair of flexible electrically insulated lead wires. A small wad of soft fibrous material is secured with respect to the heat sensing device so as to project outwardly from the heat sensing device as a center and to provide a protective cushion thereabout.

BACKGROUND OF THE INVENTION

Clinical thermometers are utilized for measuring internal body temperatures for diagnostic and research purposes. One of the important uses of clinical thermometers is in clinical anethesia. Thermometry in anesthesia is discussed in "Clinical Anesthesia," vol. 2, 1964, pp. 109–126. One of the forms of such thermometry advocated by Theodor H. Benzinger is a small thermocouple device for measuring the temperature of the tympanic membrane. A flexible thermoelectric probe is adapted to be inserted into the auditory canal until the temperature-sensitive end portion thereof contacts the tympanic membrane. The level of the electrical output signal developed by the probe is then recorded while maintaining contact with the tympanic membrane. Such a device and the method of use thereof are disclosed in Benzinger Pat. Nos. 3,054,397 and 3,156,117.

The tympanic membrane is very sensitive to pressure and one of the problems with clinical ear thermometers has been to provide a device which would be comfortable for the individual while temperature measurements are being taken and at the same time insure that the temperature sensing device of the thermometer is in contact with or sufficiently close to the tympanic membrane so as to provide accurate temperature measurements.

Therefore, it is an object of the present invention to provide a thermometer particularly suited for measuring ear drum or tympanic membrane temperature with a minimum of discomfort to the patient during the interval of time the temperature is being taken or monitored. It is a further object of the invention to provide an expendable tympanic membrane thermometer adapted primarily for a single use and including a protective cushion for the electrically insulated heat sensing portion of the thermometer constructed and arranged for distributing the end pressure of the thermometer over the tympanic membrane.

SUMMARY OF THE INVENTION

These and additional objects of this invention are accomplished by a thermometer suited primarily for measuring the temperature of the tympanic membrane in an ear canal comprising a heat sensing device of small dimensions having a pair of flexible electrically insulated lead wires connected at one end to the heat sensing device and an electrical connector element connected to the other end of the leadwires. A small wad of soft fibrous material is secured immediately adjacent the heat sensing device in a manner such that the fibrous material projects outwardly and beyond the distal end of the heat sensing device as a center thereby forming an open cavity about said heat sensing device to provide a protective cushion thereabout, the wad of material being of sufficient size to cooperate with the ear canal adjacent the tympanic membrane substantially to centralize the sensing device with respect to the tympanic membrane, to distribute the end pressure of the device over the tympanic membrane, and shield the sensing device from portions of the ear canal at temperatures different from that of the tympanic membrane.

For a more detailed disclosure of the invention and for further objects and advantages thereof, reference is to be had to the following description taken in conjunction with the accompanying drawings.

DESCRIPTION OF THE PREFERRED EMBODIMENT

Figure 1:
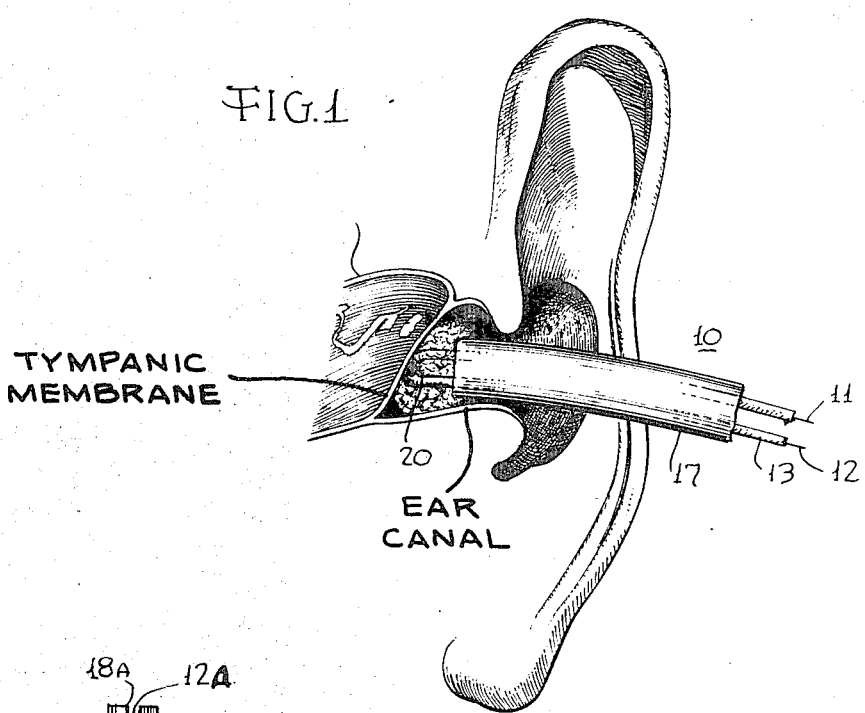
FIG. 1 illustrates the heat sensitive portion of a thermometer embodying the present invention positioned in the ear canal in contact with the tympanic membrane for a temperature measurement.
Figure 2:
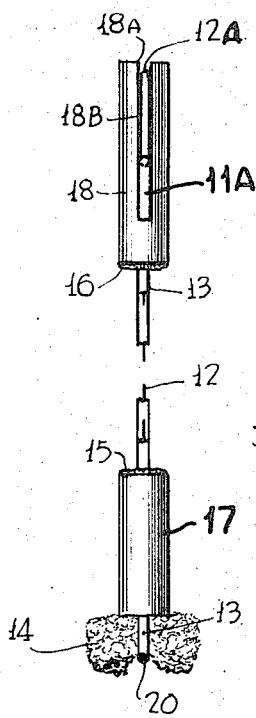
FIG. 2 is a view of a thermometer constructed in accordance with the present invention.
Figure 3:
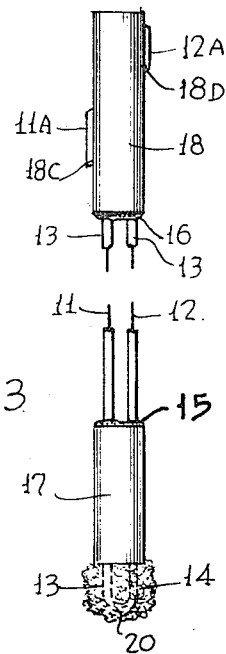
FIG. 3 is a side view of FIG. 2.

Referring to FIGS. 1–3, there is illustrated a thermometer assembly 10 including a pair of fine gauge wires 11 and 12 such as copper and constantan respectively which have been welded or otherwise joined at one end to each other to form a thermocouple and thereafter threaded serially through a capillary tube 13 or soft, flexible plastic such as polyethylene or equivalent. The length of tubing 13 is then folded back on itself so that the elements thereof are parallel leaving a loop at one end. The thermocouple junction is disposed at a location 20 centrally of the loop and the parallel free ends are threaded through a piece of soft, flexible plastic tube 17 having a diameter which is a fairly close fit for the parallel elements of the tube 13. A wad 14 of absorbent cotton, facial tissue, or other soft fibrous or sponge like cellular material is placed in the loop and the piece of plastic tubing 17 slid forward to compress and securely retain the wad of soft material in the loop. The parallel legs of the tube 13 are then heat sealed, cemented, or otherwise secured at 15 to secure the elements of the tube 13 to the tube 17.

Figure 4:
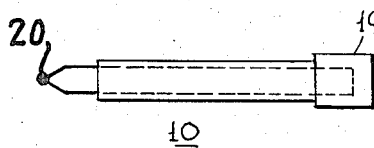
FIG. 4 is a simplified electrical circuit for providing a temperature indication utilizing the thermometer of FIGS. 1–3.

The remote parallel ends of the flexible tube 13 are then passed through a second piece of resilient tubing 18 the material of which may be the same or somewhat stiffer than that of the tube 17. The tube 18 has a sort notch 18A and a long notch 18B. The terminal ends 11A and 12A of the thermocouple wires 11 and 12 are stripped bare of the tubing 13 and thereafter drawn down to positions to be reversely bent so as to provide polarized electrical contact elements. Polarized contact elements of this type are disclosed in Moore Pat. No. 3,024,295 and Parker Pat. No. 3,048,642. The tubing 13 is then securely attached to the tube 18 by cement or heating sealing at 16 and the contact portions 11A and 12A bent into position. The ends of the contact portions 11A and 12A being of very fine wire, for example, about No. 36 B&S Gauge or finer, preferably are heated sealed to tube 18 at points 18C and 18D. A light weight female connector 19, FIG. 4, which may be of the polarized type as disclosed in the aforesaid Parker Pat. No. 3,048,642, is adapted to receive the connector of the thermometer device 10 for completing connections to a measuring instrument. As shown in FIG. 4, the measuring instrument may take the form of a meter 21 and/or a recorder 22 which are connected in circuit with a suitable amplifier 23 to which the thermometer device 10 is connected.

The thermometer assembly 10, as above described, may take several forms. Instead of utilizing a thermocouple, other suitable heat sensing devices may be utilized such as a fine coil of resistance wire symmetrically disposed at the apex of the bend 20 instead of a thermoelectric junction. Alternatively a thermistor may be used for the heat sensitive device.

The tube elements 17 and 18 may be separate members as shown in FIGS. 2 and 3 or one continuous length of tube as indicated in FIG. 1 may be used providing it is sufficiently light in weight and flexible. The compaction of the wad 14 by tightening the loop of tube 13 against the tube 17 should be such that there is no danger of losing the wad 14.

The fluff of wad 14 extending out on the sides will centralize the thermoelectric junction at 20 in the ear canal so that contact is made substantially centrally of the tympanic membrane between the smooth outer surface of the heat sensing portions of the assembly 10 and the membrane. The fluffing should be sufficiently great to distribute the end pressure over the tympanic membrane. The lead wires may be fastened to the patient's skin with adhesive tape for retention of the measuring device in the ear canal, alternatively a clamp having a clip to hold the leads and an adjusting screw to engage the lobe of the patient's ear, constructed similar to a woman's earring may be used, or any other suitable device for supporting the lead wires near the outer ear.

It will of course be understood that the thermometer device as shown in FIGS. 1–3 is illustrated on an enlarged scale more than twice its normal size. As will be clear, the overall length of the device is not critical and may be of any suitable length for the particular application. For the tube 13 a surgical grade polyethylene tube having a 0.024 inch O.D. and a 0.011 inch I.D. may be used and a thin wall outer tube just large enough to receive the two diameters of tube 13 should be used for the tube. The wad of soft material 14 was of absorbent cotton. The use of a wad of soft, downy material is desirable not only for the reasons as mentioned above, i.e., to provide for comfort, to center the heat sensing element, and avoid injury to the tympanic membrane, but additionally the soiling of the wad of material from ear wax serves to indicate the assembly 10 has been used and therefore is no longer sterile and should not be used again.

It is also to be understood that the wad 14 may be twisted in a manner to be more compact as for example in conventional cotton tipped probes. The flexibility of the tube elements 13 and 17 should be such that there is no danger of damaging the tympanic membrane when the temperature sensing end of the device is inserted in the ear canal. It is also to be understood that tube 13 may be blackened in the region of the heat sensing device to enhance reception of heat by radiant energy should firm physical contact be lost during a temperature measurement.

For the purposes of this application, the use of the term "wad of soft fibrous material" is intended to include absorbent cotton, facial tissue, or other soft fibrous or sponge-like cellular materials having substantially equivalent characteristics for the particular use of the material diclosed herein.

While the preferred embodiment of the invention has been illustrated and described, it is to be understood that further modifications thereof may be made.

What is claimed is:

1. A thermometer suited primarily for measuring the temperature of the tympanic membrane in an ear canal comprising:
   a heat sensing device of small dimensions having a smooth outer surface,
   a pair of flexible, electrically insulated leadwires connected at one end to said heat sensing device, and
   a small wad of soft fibrous material secured immediately adjacent said heat sensing device in a manner such that said fibrous material projects substantially radially outwardly and beyond the distal end of said heat sensing device as a center thereby forming an open cavity about said heat sensing device to provide a protective cushion and heat shield about the circumference of said heat sensing device, said wad of material being of sufficient size to cooperate with the ear canal adjacent the tympanic membrane substantially to centralize said heat sensing device with respect to the tympanic membrane, to distribute the end pressure of said thermometer over the tympanic membrane and shield the sensing device from heat other than that of said membrane.

2. A thermometer according to claim 1 wherein said wad of soft fibrous material is secured between said lead wires in the region of said heat sensing device.

3. A thermometer according to claim 1 wherein said heat sensing device has an outer covering of soft pliable material to provide said smooth outer surface.

4. A thermometer according to claim 1 wherein said heat sensing device is disposed within the bend of a capillary tube of soft pliable material to provide said smooth outer surface.

5. A thermometer suited primarily for measuring the temperature of the tympanic membrane in an ear canal comprising:
   a heat sensing device of small dimensions,
   a pair of flexible, electrical lead wires connected at one end to said heat sensing device, and serially disposed within the bend of a capillary tube of soft pliable material, said capillary tube being effectively blackened in the region of said heat sensing device disposed within said bend, and
   a small wad of soft fibrous material secured with respect to said heat sensing device in a manner such that said fibrous material projects outwardly from said heat sensing device as a center to provide a protective cushion thereabout, said wad of material being of sufficient size to cooperate with the ear canal adjacent the tympanic membrane substantially to centralize said heat sensing device with respect to the tympanic membrane and to distribute the end pressure of said thermometer over the tympanic membrane.

6. A thermometer suited primarily for measuring the temperature of the tympanic membrane in an ear canal comprising:
   a heat sensing device of small dimensions,
   a pair of flexible lead wires connected at one end to said sensing device,
   said heat sensing device and said lead wires being serially disposed in a first tube of soft, flexible material having a folded portion forming a loop with said heat sensing device disposed substantially centrally of said loop,
   a second length of tube surrounding the folded portion adjacent said loop, and
   a wad of soft fibrous material retained in said loop by said second length of tube, said wad of material being of sufficient size to cooperate with the ear canal adjacent the tympanic membrane substantially to centralize said heat sensing device with respect to the tympanic membrane and to distribute the end pressure of said thermometer over the tympanic membrane.

7. A thermometer according to claim 1 wherein said pair of insulated lead wires terminate in a plug-in electrical connector element at the ends thereof remote from said heat sensing device.

8. A thermometer suited primarily for measuring the temperature of the tympanic membrane in an ear canal comprising:
- a heat sensing device of small dimensions having a smooth outer surface,
- a pair of flexible, electrically insulated lead wires connected at one end to said heat sensing device,
- said heat sensing device being effectively blackened to enhance reception of heat by radiant energy, and
- a small wad of soft fibrous material secured with respect to said heat sensing device in a manner such that said fibrous material projects outwardly from said heat sensing device as a center to provide a protective cushion thereabout, said wad of material being of sufficient size to cooperate with the ear canal adjacent the tympanic membrane substantially to centralize said heat sensing device with respect to the tympanic membrane and to distribute the end pressure of said thermometer over the tympanic membrane.

9. A thermometer suited primarily for measuring the temperature of the tympanic membrane in an ear canal comprising:
- a sensing device of small dimensions having a smooth outer surface,
- a pair of flexible, electrically insulated lead wires connected at one end to said heat sensing device,
- said pair of electrically insulated lead wires being surrounded by a tubular member of electrically insulating material at the ends thereof remote from said heat sensing device with bare end portions of each lead wire secured at spaced locations on said tubular member to provide electrical contacts of an electrical connector, and
- a small wad of soft fibrous material secured with respect to said heat sensing device in a manner such that said fibrous material projects outwardly from said heat sensing device as a center to provide a protective cushion thereabout, said wad of material being of sufficient size to cooperate with the ear canal adjacent the tympanic membrane substantially to centralize said heat sensing device with respect to the tympanic membrane and to distribute the end pressure of said thermometer over the tympanic membrane.

10. A thermometer according to claim 9 wherein said tubular member is notched and said bare end portion of each lead wire is fastened to the outside of said tubular member at locations spaced along said tubular member as determined by the depth of a notch to provide said electrical contacts.

11. A thermometer according to claim 1 wherein said wad of soft fibrous material is absorbent cotton.

12. A thermometer according to claim 1 wherein said heat sensing device is a thermoelectric junction.

References Cited

UNITED STATES PATENTS

| | | | |
|---|---|---|---|
| 490,679 | 1/1893 | Price | 128—409 |
| 3,156,117 | 11/1964 | Benzinger | 73—359 |

LOUIS R. PRINCE, Primary Examiner

FREDERICK SHOON, Assistant Examiner

U.S. Cl. X.R.

136—221

PO-1050
(5/69)

UNITED STATES PATENT OFFICE
CERTIFICATE OF CORRECTION

Patent No. 3,531,992   Dated October 6, 1970

Inventor(s) P. J. Moore

It is certified that error appears in the above-identified patent and that said Letters Patent are hereby corrected as shown below:

Column 1, line 27, "anethesia" should read --anesthesia--.

Column 2, line 35 "or" should read --of--;
         line 55, "sort" should read --short--;
         line 63, "heating" should read --heat--;
         line 67 "heated" should read --heat--.

Claim 8, column 5, line 19, "mem-" should read --membrane--.

SIGNED AND
SEALED
JAN 5 1971

(SEAL)
Attest:

Edward M. Fletcher, Jr.
Attesting Officer

WILLIAM E. SCHUYLER, JR.
Commissioner of Patents